Nov. 28, 1961 W. E. SOLLECITO 3,010,320
FLUID LEVEL SENSOR
Filed June 18, 1957 3 Sheets-Sheet 1
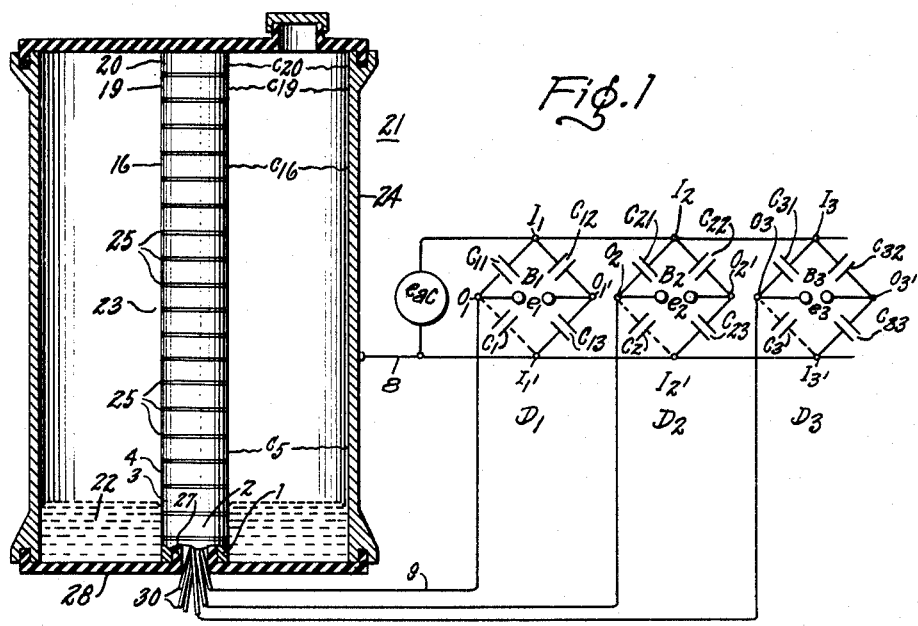
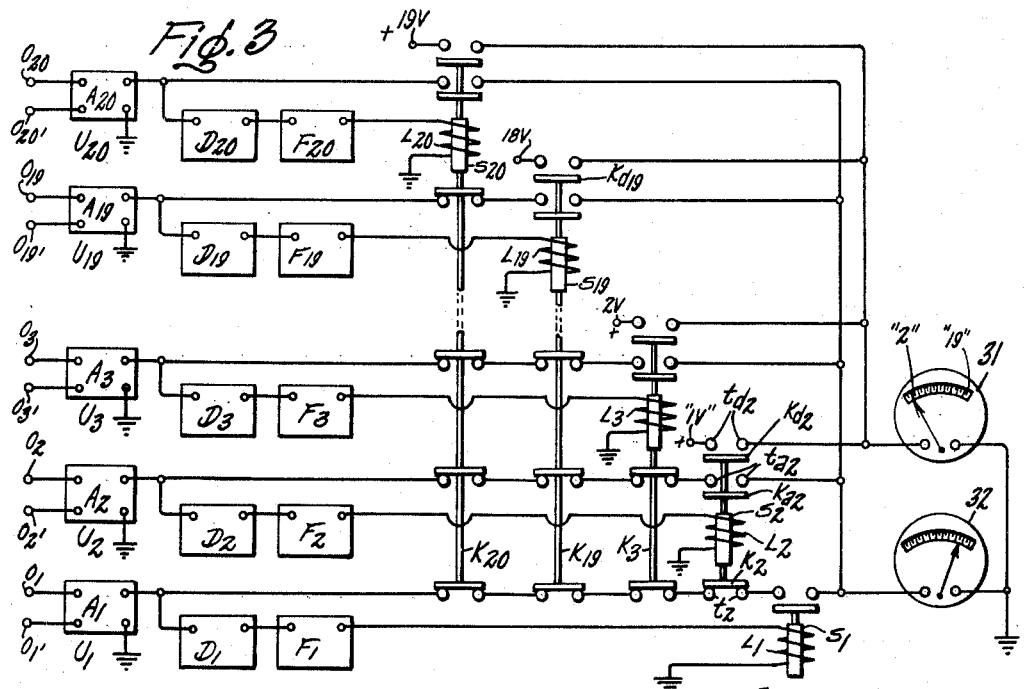
Inventor
William E. Sollecito
by Newton D. Moore
His Attorney Nov. 28, 1961 W. E. SOLLECITO 3,010,320
FLUID LEVEL SENSOR
Filed June 18, 1957 3 Sheets-Sheet 2
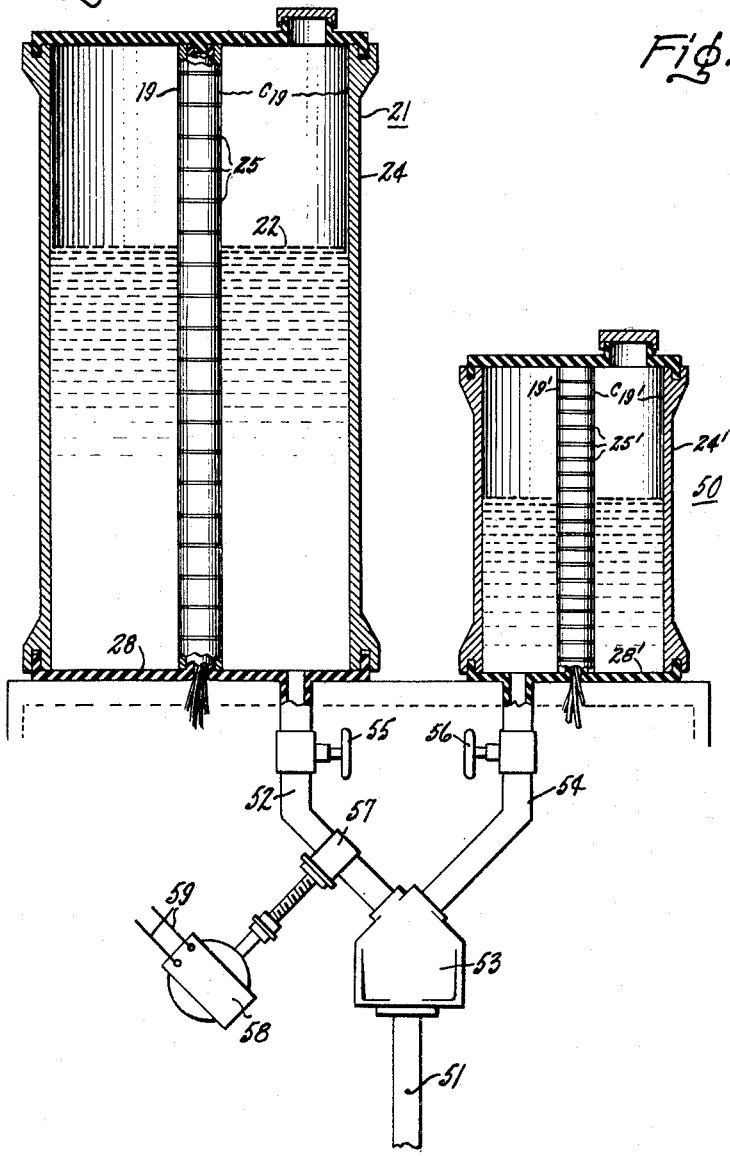
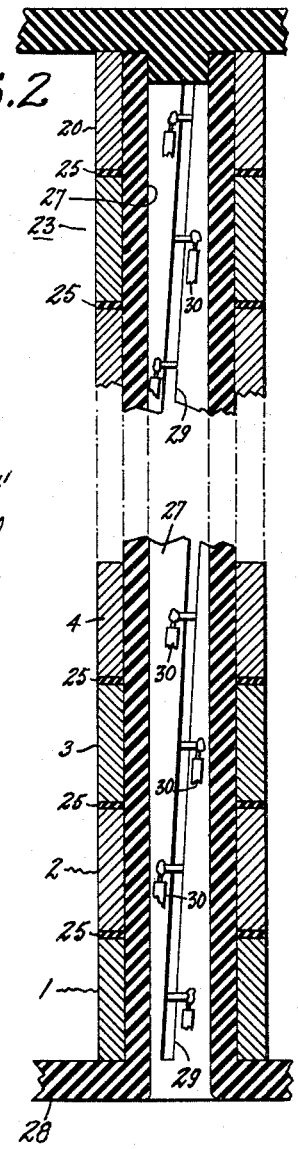
Inventor:
William E. Sollecito
by Merton D. Morse
His Attorney Nov. 28, 1961 W. E. SOLLECITO 3,010,320
FLUID LEVEL SENSOR
Filed June 18, 1957 3 Sheets-Sheet 3

Inventor:
William E. Sollecito
by Merton D Morse
His Attorney

United States Patent Office 3,010,320
Patented Nov. 28, 1961

3,010,320
FLUID LEVEL SENSOR
William E. Sollecito, Schenectady, N.Y., assignor to General Electric Company, a corporation of New York
Filed June 18, 1957, Ser. No. 666,288
8 Claims. (Cl. 73—304)

This invention relates to improvements in fluid level measuring apparatus. More particularly, the invention is directed to apparatus which may be used to determine and provide an indication of the fluid level of one or more fluid bodies at some remote point and for determining and indicating the difference in fluid levels of such bodies. The present invention contemplates utilization circuitry and apparatus for employing such information for operations such as fluid level control, fluid volume control, and control of flow rates, either in an individual body or the relative flow rates in more than one body.

Many modern fluid level measurement and control applications, such as fuel indication and control for flight propulsion systems, require a high degree of accuracy. In particular, the fuel supply for flight propulsion systems has presented problems which require special liquid level measuring and control techniques. For example, in certain flight propulsion systems, it is desirable to empty two fuel tanks at a given relative rate or to empty two such tanks at exactly the same time. In order to accomplish such results, it is necessary to provide a highly accurate means to control rates of flow of fuel from the tanks. Such control requires equally accurate means to sense and indicate fluid levels and difference in levels of fluids in two or more containers which may not be the same in size.

One approach to measuring fluid level is the digital or discontinuous approach wherein the fluid level is only sensed at particular marker points. No attempt is made to sense or indicate the position of the fluid level between these marker points. Such fluid level indicators generally are not very accurate and therefore are not used where accuracy is required. In addition, most digital fluid level measuring systems have the disadvantage that they depend upon current conduction of the fluid within the container. Where fluid being measured is inflammable, such a system is not desirable.

The antithesis of the digital approach to fluid level measurement is the analog or continuous approach. In one of the most satisfactory analog approaches to fluid level or volume measurement, a capacitor is used as the fluid level sensor. The fluid being measured is used as the dielectric of the capacitor and measurements of variations in capacitance caused by fluid level changes is used to provide an indication of fluid level or volume. An example of such apparatus is disclosed and claimed in U.S. Patent 2,409,073, issued October 8, 1946 to Frederick R. Sias and assigned to the assignee of the present invention.

Where a single capacitor is used as the fluid level sensor and the change in capacitance is a continuous (analog) function of the fluid level height, the accuracy of the system may reasonably be expected to be 1% or thereabouts. For example, where a single capacitor is utilized to measure a fluid depth of ten feet, the accuracy of measurement and hence the fluid level control, if such is being used, should be within 1% of the ten foot capacitor height; i.e., within 0.1 foot. If a greater degree of accuracy is required for the particular application, some means other than the simple analog system of measuring fluid level must be used.

Accordingly, it is an object of this invention to provide a means of measuring the fluid level of a fluid body which is of greater accuracy than is available with conventional purely analog or purely digital systems.

It is a further object of this invention to provide a highly accurate fluid level measuring system which utilizes a synthesis of the analog and digital approaches.

Another object of this invention is to provide an accurate means for sensing the fluid level of one or more fluid bodies and utilizing such information to provide fluid level control.

It is a further object of this invention to provide a means of sensing the relative fluid level of two or more fluid bodies.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

FIG. 1 is a cross-sectional side-elevational view of a fluid container having fluid level sensors of the type utilized in carrying out this invention and a schematic circuit diagram illustrating circuitry for producing an electrical indication of the condition of the sensors;

FIG. 2 is a detailed view of a segment of the tank of FIG. 1 illustrating a particular configuration of fluid level sensors which may be utilized therein;

FIG. 3 is a schematic diagram illustrating circuitry utilized in connection with the circuitry of FIG. 1 for obtaining an indication or measure of the fluid level in the container of FIG. 1 when using fluid level sensors as illustrated in FIG. 2;

FIG. 4 is a side elevational view in cross section of a pair of containers utilized in illustrating and describing the operation of a multitank fluid level measuring system;

Figure 5:
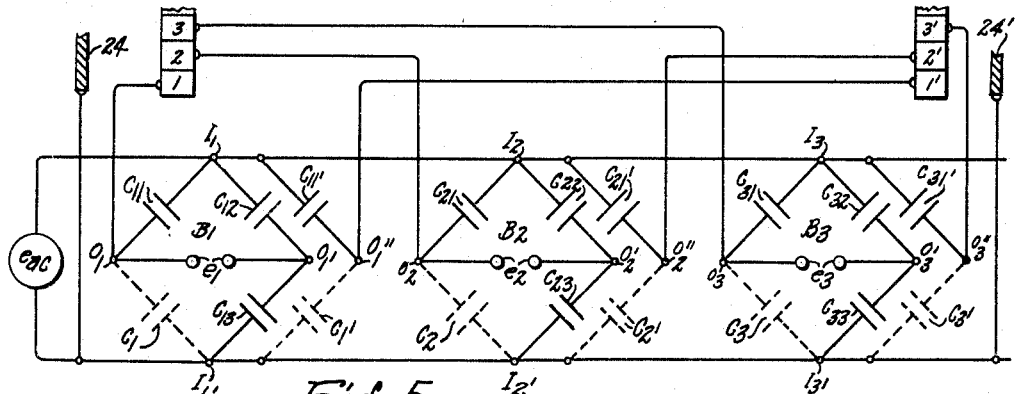
FIG. 5 is a schematic diagram illustrating circuitry utilized in measuring the fluid level in two containers simultaneously and in obtaining the relationships of the fluid levels.

Briefly stated in accordance with one aspect of this invention, the fluid level in a container or a pair of containers is measured by utilizing the fluid itself as a dielectric material for capacitance means and sensing the fluid level in a digital and analog manner in accordance with the capacitance of the capacitance means. Further, in accordance with certain aspects of the invention, the capacitance is utilized with control means to control fluid level.

As illustrated in FIG. 1, the fluid body 22, the level of which is to be measured, partially fills a tank or container 21. In order to provide an indication of the liquid level in the container 21, the liquid 22 is utilized as a dielectric material between the plates or electrodes of a series of capacitors $C_1$ through $C_{20}$ inclusive. In the embodiment illustrated, the outer metallic shell 24 of tank 21 is used as a common electrode or plate of the capacitors $C_1$ through $C_{20}$ and the opposite plates of the capacitors $C_1$ through $C_{20}$ are formed by annular sections 1 through 20, inclusive, of a hollow rod 23 which is vertically disposed in the center of the tank 21. The outer shell of tank 21 is used as a capacitor plate since it is a most convenient means; however, a separate electrode inserted in the body of fluid 22 may be used instead.

The specific configuration of the inner capacitor plates may best be seen by referring to FIG. 2 wherein the sections 1 through 20, inclusive, of the rod which make up the inner capacitor plates are illustrated as being insulated one from another by insulating rings or discs 25 placed between each adjacent section. Thus, the inner capacitor plates have the appearance of a series of cylindrical or annular rings stacked one on top of the other.

In the embodiment illustrated, these capacitor plates 1 through 20 are supported by means of a cylindrical supporting rod 27 of insulating material which extends upwardly from the bottom 28 of the tank 21 through the center of the sectioned rod 23. In order that electrical leads or conductors 30 may be connected to each of the capacitor plates 1 through 20 and brought out through the central supporting rod 27, the rod 27 is provided with a spiral slot 29 which extends over its entire length. As illustrated, the vertical supporting rod 27 and the bottom 28 of the tank 21 are formed of a unitary piece of insulating material. Thus, the metallic outer shell 24 of the tank 21 is electrically insulated from the metallic capacitor plates 1 through 20, inclusive.

The dielectric between the plates of capacitors $C_1$–$C_{20}$, inclusive, constitutes air or a gas above the level of the fluid 22 and the fluid itself below this level. Therefore, the capacitance of each of the capacitors above the liquid level 22 is a small value determined by its dielectric material (mainly air) and the capacitance of those capacitors which are wholly below the level of the fluid 22 remains a larger value as determined by their dielectric material (mainly fluid 22) between their plates. Since the fluid level, as illustrated, is located within the third capacitance section $C_3$, the dielectric of this section is made up of air and the fluid. As the fluid level changes in this sensor (capacitor $C_3$), an appreciable change in the capacitance is produced. This change in capacitance provides a measure of the change of liquid level within the third capacitor section. The analog aspects of the system are apparent from the fact that the capacitance change is continuous over each section (such as the third section in the illustration) and the digital aspects are apparent from the fact that each section of the rod 27, i.e., each capacitor, gives an indication as to whether or not the particular section contains fluid.

By utilizing both the digital and analog aspects of the system, its accuracy is increased considerably over the accuracy of either a pure analog system or a pure digital system. This is true since the analog system utilized in the present system is comprised of each of the separate capacitance sections, $C_1$–$C_{20}$, instead of a single capacitor which extends over the total container height. The accuracy then is increased by a factor of $$\frac{1}{\frac{\text{length of section}}{\text{total capacitor length}}}$$

where the total capacitor length is the total inside height of the container 21. Thus, if 20 capacitor sections are utilized in a tank which is ten feet high, each capacitor section is approximately 0.5 foot high in contrast with the one capacitor ten feet high, as set forth in the previous example (see page 2). By this means, the system accuracy is increased from 0.1 foot to .005 foot.

Obviously, the number of capacitor sections is chosen to obtain the desired degree of accuracy. If the accuracy at various levels of the tank need not be the same, then the sections do not have to be of equal height. For example, the system accuracy at the top of the tank may not be critical, whereas it may be necessary to have a high degree of accuracy near the bottom. Under these circumstances, the sections near the top of the tank are made relatively long whereas the sections near the bottom of the tank must be short in comparison.

The means by which the level control and measurement is accomplished is illustrated in FIGS. 1 and 3. The circuitry utilized for generating a voltage which is proportional to the capacitance of each capacitor includes a series of capacitance bridges $B_1$, $B_2$, $B_3$ . . . $B_{20}$, each of which contains one of the sensing capacitors $C_1$, $C_2$, $C_3$ . . . $C_{20}$, respectively. In order to simplify the description and discussion, only three bridge circuits ($B_1$, $B_2$ and $B_3$) are illustrated in FIG. 1; however, the remaining bridge circuits are identical and operate in the same manner with the exception that each utilizes a different one of the sensing capacitors $C_1$–$C_{20}$.

As may best be seen in FIG. 1, the first bridge circuit $B_1$ includes output terminals $O_1$ and $O_{1'}$ and input terminals $I_1$ and $I_{1'}$, a pair of capacitors $C_{11}$ and $C_{12}$ connected in two adjacent bridge arms with input terminal $I_1$ at the junction therebetween, and a fixed capacitor $C_{13}$ and the sensing capacitive element $C_1$ in the opposite two bridge arms. The sensing capacitor $C_1$ is illustrated in the bridge circuit $B_1$ in broken lines to show its position; however, it is noted that the outer plate 24 and the inner plate 1 which form the capacitor $C_1$ are actually connected in the bridge circuit $B_1$ by means of leads 8 and 9.

The two input terminals $I_1$ and $I_{1'}$ of the bridge are connected to be energized from a source of alternating voltage $e_{ac}$ and the output terminals $O_1$ and $O_{1'}$ are connected to supply an output voltage $e_1$ to a utilization circuit which is described in detail subsequently. Since the sensing capacitor $C_1$ is the only variable element in bridge circuit $B_1$, the bridge output signal voltage $e_1$ may be used to provide an indication of its value.

Each subsequent bridge circuit is a substantial duplicate of the one just described and therefore the elements of these circuits are given corresponding reference characters and the same subscripts as the bridge circuit numbers. The sensing capacitors are labelled $C_2$ through $C_{20}$, and the input and output terminals are given corresponding reference characters with subscripts which indicate the number of the bridge circuit with which they are associated.

The method of measuring the capacitance of the capacitive elements illustrated and described in connection with FIG. 1 represents a preferred method but is only one of many methods that may be employed. The simple capacitance bridge circuits $B_1$, $B_2$, and $B_3$ in FIG. 1 have a capacitor in each arm in order to eliminate problems of phase shift which are likely to occur when mixed components are used in the bridges.

In bridge $B_1$, capacitors $C_{11}$, $C_{12}$ and $C_{13}$ are adjusted to values approximately equal to $C_1$ when the level of the liquid 22 is zero; i.e., the tank is empty. In bridge $B_2$, capacitors $C_{21}$, $C_{22}$ and $C_{23}$ are adjusted to values approximately equal to $C_2$ when the level of the liquid 22 is at the top of $C_1$. In bridge $B_3$, capacitors $C_{31}$, $C_{32}$, and $C_{33}$ are adjusted to values approximately equal to $C_3$ when the level of the liquid 22 is at the top of $C_2$. The bridge circuits are all balanced to give a zero output voltage at these respective liquid levels. Therefore, an inphase output voltage is produced between the output terminals $O$ and $O'$ of the twenty bridge circuits $B$ only when the unknown capacitor in the particular circuit contains some of the liquid being measured. For example, with the arrangement illustrated in FIG. 1, the fluid 22 covers the sectioned plates 1 and 2 of capacitors $C_1$ and $C_2$ and covers a portion of plate 3 of capacitor $C_3$. The remaining capacitors $C_4$ through $C_{20}$, inclusive, are entirely above the liquid level. Thus, the bridges $B_4$ through $B_{20}$, inclusive (not shown), produce output voltages between their output terminals $O_1$ and $O_{1'}$ which are out of phase with the supply voltage $e_{ac}$. However, the first two bridges $B_1$ and $B_2$ produce a large inphase output voltage since their inner section plates 1 and 2 are fully submerged beneath the fluid 22 and the third bridge $B_3$ produces a voltage which is proportional to the position of the level of liquid 22 on its inner section plate 3.

In order to utilize the voltages produced by the bridge circuits $B_1$ through $B_{20}$, inclusive, utilization circuitry such as that illustrated in FIG. 3 is provided. The circuit for each one of the twenty bridge circuits is substantially identical in operation except for minor variations in interlocking arrangements which are explained in detail subsequently. As a consequence, the illustration is limited to the utilization circuits $U_1$, $U_2$ and $U_3$, which are used with the first three bridge circuits $B_1$, $B_2$ and $B_3$ (and therefore with the first three capacitors sensors $C_1$, $C_2$ and $C_3$, which are at the bottom of the tank), and the last two utilization circuits $U_{19}$ and $U_{20}$ which are utilized with the last two bridge circuits $B_{19}$ and $B_{20}$ (and, therefore, the two capacitor sections $C_{19}$ and $C_{20}$ which are at the top of tank 21).

According to the general philosophy of this invention, the utilization circuits are provided to give an indication as to which one of the capacitor sections $C_1$–$C_{20}$ contains liquid (digital information) and also to give a precise indication of the liquid level within the particular capacitor section (analog information). The particular utilization circuits illustrated in FIG. 3 accomplish these functions by providing a means to inactivate all utilization circuits except that one which is associated with the capacitor section containing the upper limit of the liquid; i.e., that capacitor section wherein the boundary between the liquid and the air is located.

An indicating instrument 31 (a voltmeter) gives the digital information and may be calibrated to read, for example, in terms of the number of full capacitor sections 1 through 19, inclusive, and another instrument 32 is provided to indicate the precise level of the liquid within a given capacitor section. As previously indicated, the utilization circuit which is associated with the particular capacitor section wherein the boundary between the fluid 22 and air is located is connected to energize both instruments 31 and 32 in the manner necessary to give the proper liquid level indication. For example, the liquid level is in the third capacitor section of the tank as illustrated in FIG. 1; therefore the third utilization circuit $U_3$ is connected to supply information to the digital reading instrument 31 so that the instrument reads "2", indicating that the first two capacitor sections are full of liquid and the analog instrument 32 indicates the percentage of the third capacitor section which is full of the liquid 22.

The first utilization circuit $U_1$, which is used with the first bridge circuit $B_1$, includes input terminals $O_1$ and $O_{1'}$ which are connected to receive the output voltage $e_1$ applied between the corresponding referenced output terminals of bridge circuit $B_1$. A conventional electronic amplifier $A_1$ is connected to these input terminals to receive the output voltage $e_1$ from the first bridge circuit $B_1$. The amplifier $A_1$ may be of any conventional type such as an electronic amplifier of the type illustrated in FIG. 5–4 on page 120 of the book by H. J. Reich, entitled Principles of Electron Tubes, published by McGraw-Hill Book Company, Inc., 1941. The output potential from the amplifier $A_1$ is connected through a plurality (nineteen) of switch interlocking contact arms $K_2$ through $K_{20}$, inclusive, to one of a pair of terminals $t_{a1}$ of interlocking relay $S_1$ and also through a conventional phase sensitive demodulator $D_1$ and any conventional "on-off" type circuit $F_1$ to the energizing coil $L_1$ of the interlocking relay $S_1$. The other one of the pair of contacts $t_{a1}$ is connected to the analog indicating instrument 32. The switch contact arms $K_2$ through $K_{20}$ may be called interlocking contact arms since the voltage from the amplifier $A_1$ cannot be applied to the analog instrument 32 when any one of these switch arms is open. These switch arms are mechanically associated with interlocking relays $S_2$ through $S_{20}$, inclusive, in the utilization circuit which is numbered to correspond to the subscript of both the interlocking contact arm and interlocking relay. For example, interlocking contact arm $K_{20}$ in utilization circuit $U_1$ is mechanically connected to be operated by an interlocking relay ($S_{20}$) in the twentieth utilization circuit $U_{20}$. These interlocking contacts are provided to prevent application of a voltage from the first utilization circuit to the analog instrument 32 when any one of the utilization circuits $U_2$ through $U_{20}$ is energized.

Each of the twenty phase sensitive demodulators D may be conventional amplistat discriminators such as the one illustrated in FIG. 26.16 on page 447 of the book entitled Magnetic Amplifiers by Dr. H. F. Storm, published by John Wiley and Sons, 1955. The comparator circuits F are preferably of the type illustrated in FIG. 6.6 of Table 6 on page 428 of the book entitled Electronic Analog Computers by Korn and Korn, published by McGraw-Hill Book Company, Inc., second edition 1956, for the condition where $e_{c2}=e_c=0$. When bridge circuit $B_1$ is balanced, there is no voltage applied to the amplifier $A_1$ and, consequently, no voltage is applied to the analog instrument 32. However, if there is any liquid within first capacitor section $C_1$, an in-phase voltage $e_1$ (in phase with supply voltage $e_{ac}$) is produced between the input terminals $O_1$ and $O_{1'}$. The voltage $e_1$ is amplified by amplifier $A_1$ and applied to one of the pair of terminals $t_{a1}$ of interlocking relay $S_1$ through the interlocking switch arms $K_2$ through $K_{20}$. The amplified voltage $e_1$ is also applied to the demodulator $D_1$ which produces a positive unidirectional potential which is applied to a comparator circuit $F_1$. Thus, comparator circuit $F_1$ applies an energizing potential to the coil member $L_1$ of interlocking relay $S_1$. The analog switch arm $K_{a1}$ bridges the terminals $t_{a1}$ and thereby provides a circuit to apply the voltage of the first amplifier $A_1$ to the analog instrument 32.

The remainder of the utilization circuits $U_2$ through $U_{20}$ inclusive have input terminals which are connected to their corresponding bridge circuits $B_2$ through $B_{20}$ respectively, and each of the utilization circuits contains an amplifier A to amplify the voltage applied to the utilization circuits from the respective bridge, a demodulator circuit D for producing a unidirectional potential which is a function of the amplifier output voltage (amplitude and phase), and a comparator circuit F for producing a predetermined positive potential when the output voltage of its associated demodulator is a positive value. The corresponding components of each utilization circuit are given like reference characters with subscripts which correspond to the number of the utilization circuit in which they are connected. For example, the second utilization circuit $U_2$ contains amplifier $A_2$ and the third utilization circuit $U_3$ contains amplifier $A_3$.

As was previously indicated, each of the remaining utilization circuits contains an interlocking electromagnetic relay S which insures that only that utilization circuit which corresponds to the capacitor section having the upper level of the liquid therein is operative to apply voltages to digital and analog instruments 31 and 32, respectively. It is noted that the utilization circuit $U_1$ does not apply a voltage to the digital instrument 31 under any condition.

The second utilization circuit $U_2$ is typical of the remainder of the utilization circuits in that it contains all of the major elements of the other utilization circuits. The input terminals of the second utilization circuit $U_2$ are given the reference numerals $O_2$ and $O_{2'}$ which correspond to the output terminals of the second bridge circuit $B_2$ and indicate that this circuit is connected to receive the voltage $e_2$ produced by the second bridge circuit $B_2$. The amplifier $A_2$ provides the desired amplified voltage which is applied to one of a pair of terminals $t_{a2}$ of the relay, through a plurality of interlocking switch contact arms $K_3$ through $K_{20}$, inclusive, and also to the demodulator $D_2$. The demodulator produces a unidirectional potential having a polarity and amplitude determined by the amplified voltage and applies this voltage to the comparator circuit $F_2$ which applies an energizing potential to coil $L_2$ of interlocking relay $S_2$ when, and only when, demodulator $D_2$ produces a positive output voltage. The opposite one of the pair of interlocking relay terminals $t_{a2}$ is connected to the analog indicating instrument 32. In addition to the pair of terminals $t_{a2}$, the interlocking relay $S_2$ is provided with two other sets of terminals $t_{d2}$ and $t_2$ and their associated switch arms $K_{d2}$ and $K_2$ respectively. One of the switch arms $K_2$ is the interlocking switch arm which is provided to bridge contacts in the first utilization circuit $U_1$ when the relay is de-energized. The remaining switch arms ($K_{a2}$ and $K_{d2}$) do not bridge their terminals when the interlocking relay $S_2$ is de-energized. One of these switch arms $K_{a2}$ is provided to bridge the contacts $t_{a2}$ when the relay is energized, thereby to connect the output of the amplifier $A_2$ directly to the analog indicating instrument 32. The remaining switch arm $K_{d2}$ is provided to bridge its contacts $t_{d2}$ when the interlocking relay $S_2$ is energized, thereby to connect a source of voltage (applied to the terminal marked "1V") to the digital instrument 31. This one volt makes the digital meter needle indicate 1 unit on the dial.

In operation, when the liquid level is within the first capacitor section $C_1$, an indication of the exact level is produced on the analog indicating instrument 32 and gives the exact level within that section. However, if the liquid level rises above the first capacitor section, the first two bridges $B_1$ and $B_2$ both produce output voltages which are in phase with the supply voltage $e_{ac}$, therefore a voltage $e_2$ is applied to the amplifier $A_2$ of utilization circuit $U_2$. This voltage causes a unidirectional potential type applied to the coil member $L_2$ of the interlocking relay $S_2$, thereby to energize this relay. Energization of interlock relay $S_2$ causes the switch arms $K_{a2}$ and $K_{d2}$ to bridge their respective terminals $t_{a2}$ and $t_{d2}$ and the switch arm $K_2$ to disconnect this circuit from the analog indicating instrument 32. When switch contact arm $K_{d2}$ bridges its terminals $t_{d2}$, it connects the one volt source to the digital instrument 31 to provide an indication of "1." At the same time, the output of the amplifier $A_2$ is connected to the analog indicating instrument 32 by switch contact arm $K_{a2}$ to provide an indication of the exact level of the liquid within the second capacitor section. For example, if the level is half-way up in the second capacitor section $C_2$, the digital indicating instrument 31 reads "1" and the analog indicating instrument 32 reads "0.5," giving a total indication of 1.5. Of course, the particular calibration of the instruments is not critical to the invention. They may be calibrated to read the level of the liquid, the volume of the liquid, or any other related parameter.

As was previously noted, the utilization circuit $U_1$ includes the series combination of 19 interlocking contact arms $K_2$ through $K_{20}$. The utilization circuit $U_2$ contains one less such series combination of contacts; i.e., interlocking contacts $K_3$ through $K_{20}$ and each of the remaining utilization circuits $U_3$ through $U_{20}$ is substantially the same as the utilization circuit for the second bridge $U_2$, only each such circuit has one less interlocking switch arm in series therewith and each of the interlocking relays for each subsequent relay utilization circuit opens all of the previous utilization circuits. Thus, only that circuit which corresponds to the capacitor section having the fluid level therein is connected to the digital and analog instruments 31 and 32. In order to give a proper indication on the digital information reading instrument, the upper contacts of each of the interlocking relays $S_2$ through $S_{20}$ connect a voltage to the digital indicating instrument 31, which voltage causes the indicator thereon to indicate the number of capacitor sections which are full. For example, when utilization circuit $U_3$ is the controlling circuit, the digital instrument 31 reads "2," thus indicating that the first two capacitor sections $C_1$ and $C_2$ are full. The same is true for all of the remaining utilization circuits, so that an indication of "19" is produced on the digital indicating instrument 31 by the last utilization circuit $U_{20}$ when the last capacitor section $C_{20}$ contains liquid. It should also be noted that the interlocking relay $S_{20}$ for the last utilization circuit $U_{20}$ has an interlocking contact for opening each preceding utilization circuit when it is energized, and the interlocking relays for each of the preceding utilization circuits contains progressively one less interlocking contact.

When tank 21 is filled, the utilization circuits are employed sequentially (from $U_1$ to $U_{20}$) as the liquid level rises and the particular utilization circuit employed disconnects each of the previous utilization circuits. If the tank 21 is full and the liquid level is decreasing, utilization circuit $U_{20}$ is employed first and disconnects each of the preceding utilization circuits ($U_{19}$ down through $U_1$) from the indicating instruments 31 and 32. As fluid level drops and passes out of the twentieth capacitor section, the bridge $B_{20}$ produces an in-phase signal voltage which reduces to zero in magnitude and then reverses its phase. At this point, locking relay $S_{20}$ is de-energized. The output of amplifier $A_{20}$ and the +19V are removed from the analog and digital instruments, respectively, and its interlocking switch arms $K_{20}$ are closed in all the rest of the utilization circuits. Coil member $L_{19}$ of interlocking relay $S_{19}$ in the nineteeth utilization circuit $U_{19}$ is energized and opens all of the preceding circuits $U_{18}$ through $U_1$, inclusive. Energization of this relay connects the marked +18V to the digital indicating instrument 31 through the switch arm $K_{d19}$ and the output of the utilization circuit $U_{19}$ to the analog reading instrument 32 through its switch arm $K_{19}$. Thus, the digital instrument 31 reads "18" to indicate that eighteen capacitor sections are full and the analog instrument 32 reads the exact level of the fluid 22 within the nineteenth capacitor section $C_{19}$.

From the above discussion, it is seen that a means of measuring liquid level in a single tank is provided by providing a plurality of sectioned variable capacitance capacitors wherein the level of the liquid in the container determines the value of capacitance. This capacitance indicates liquid level, volume or weight of fuel in the tank. The liquid level measurement system is digital in that the measurement is taken over one capacitor section at a time and is analog in character in that the measurement is continuous over each section. The liquid level measurement is made without using moving parts such as floats, levers, gearing, electrical contacts or the like. It is obvious that a number of modifications could be made in the circuit arrangement disclosed without departing from the invention. For example, one such modification might be to utilize only one fixed bridge arm having one fixed capacitor in each arm such as the capacitors $C_{12}$ and $C_{13}$ of bridge circuit $B_1$ and have one variable bridge arm for each capacitor section $C_1$ through $C_{20}$, inclusive, which bridge arms are identical to the variable bridge arms shown in the circuit of FIG. 1 for each capacitor section. With this arrangement, the output voltage for each capacitor section may be taken between the output terminal of the pair of variable arms under consideration and the output terminal $O_1$ of the fixed pair of arms for the bridge. Such an arrangement has the advantage of being simple and requiring a minimum of circuit components. The invention is particularly applicable to the determination of fluid levels and relative fluid levels in two tanks which may or may not be of the same size. FIG. 4 shows two tanks of identical construction but different sizes to illustrate this point. For convenience, the large container of FIG. 4 is illustrated as being identical to the container 21 illustrated in FIG. 1 and the corresponding elements thereof are given the same reference numerals. The second container 50 is shown as being identical in construction to the container 21 except that it is smaller. In order to simplify the description, the elements of the small container 50 which correspond to the elements of the large container 21 are given the same reference numerals with the exception that they are primed. For example, the individual capacitors formed by the sectioned rod 23 of container 21 are given the numerals $C_1$ through $C_{20}$, inclusive, whereas the corresponding capacitors in the smaller container 50 are given the reference numbers $C_{1'}$ through $C_{20'}$, inclusive.

In the two container systems illustrated in FIG. 4, the liquid from the containers is drained through a common conduit 51. The fluid from container 21 flows through the output conduit 52 and the coupling member 53 into the conduit 51, and the fluid in container 50 flows through the output conduit 54 to the coupling member 53. Each of the outlet conduits 52 and 54 of the two containers is provided with control valves 55 and 56, so that the fluid flow from the two tanks may be adjusted manually. The outlet conduit 52 from the container 21 is provided with an automatic control valve 57 which may be of any conventional type, such as solenoid type or motor-driven type. By way of illustration, a motor-driven type is shown diagrammatically in FIG. 4.

Figure 6:
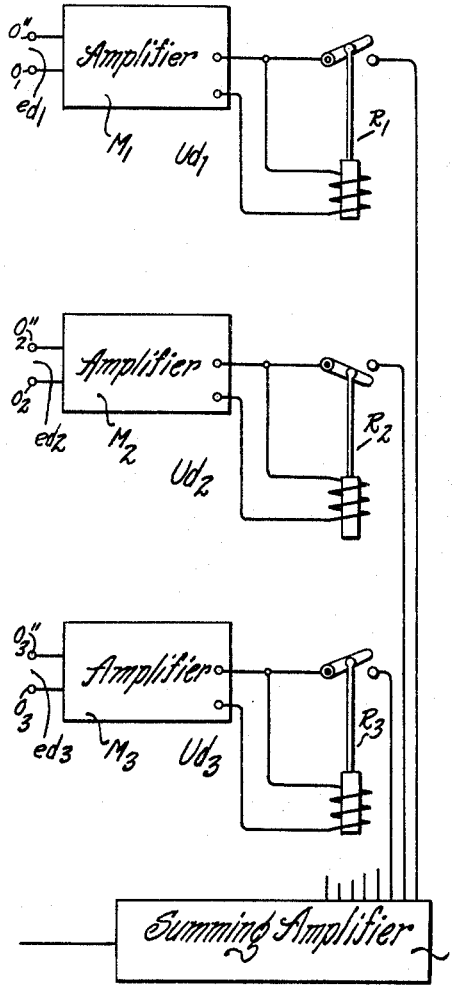
FIGS. 6 and 7 are schematic diagrams illustrating circuitry which utilizes the electrical output from the circuitry of FIG. 5, to give a measure of the difference in fluid levels in the two containers.
Figure 7:
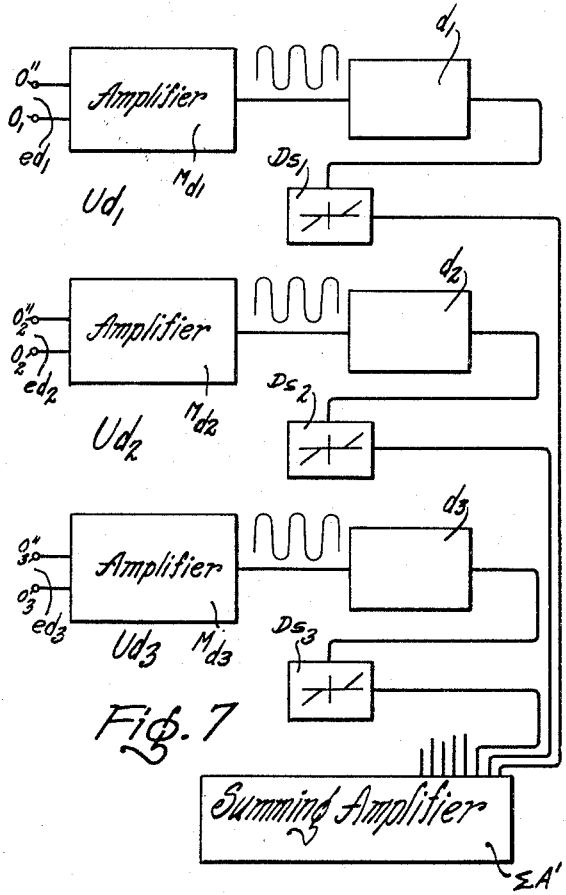

In order to control the fluid level in the two tanks, the motor 58 which operates the automatic control valve 57 has input terminals 59 connected to receive the output voltages from the control circuits illustrated in FIGS. 5 and 6 or 5 and 7. The control circuits perform the function of sensing fluid level in the containers and supplying control voltages for controlling the liquid level in the containers in accordance with a predetermined plan. For most control purposes of the type contemplated here, the desired control function may be accomplished by controlling the fluid flow from only one tank; however, it is to be understood that a control valve, such as control valve 57 in the outlet conduit 52 of containers 21, may also be inserted in the outlet conduit 54 of the small container 50, if necessary.

A satisfactory sensing circuit is illustrated in FIG. 5. In this circuit, a series of bridge circuits $B_1$ through $B_{20}$, inclusive, is provided to ascertain or sense the liquid level in the tank 21. These bridge circuits are identical to those illustrated and described in connection with FIG. 1 and provide voltages $e_1$ through $e_{20}$, inclusive, which are indicative of the liquid level in the tank 21 just as previously described. However, in order to provide the information regarding the relative liquid levels in the two tanks 21 and 50, an extra pair of bridge arms is provided for each one of the bridges $B_1$ through $B_{20}$, inclusive. One of each pair of arms contains an adjustable fixed capacitor, the opposite bridge arm contains the capacitor section from the small container 50, which section corresponds to the section of the large container 21 in the particular bridge circuit, and the junction or terminal between these two capacitors is used as a bridge output terminal.

The extra pair of bridge arms for the first bridge circuit $B_1$, for example, is connected between input terminals $I_1$ and $I_{1'}$ and includes adjustable fixed capacitor $C_{11'}$ and the first capacitor section $C_{1'}$ from small tank 50. The terminal $O_{1''}$ between these two bridge elements is used with output terminal $O_1$ to provide an output voltage $e_{d1}$. This circuit constitutes a bridge circuit which is called a "difference bridge" since it produces an output voltage $e_{d1}$ which is proportional to the difference between the values of the two capacitors $C_1$ and $C_{1'}$.

Thus, the voltage $e_1$ between the terminals $O_1$ and $O_{1'}$ is proportional to the level of the liquid in the first container 21 and the voltage $e_{d1}$ between the terminals $O_1$ and $O_{1''}$ is a function of the difference in liquid levels in the two containers 21 and 50. A corresponding pair of bridge circuits is provided for each set of sectioned capacitors $C_1$ and $C_{1'}$ through $C_{20}$ and $C_{20'}$, inclusive, and therefore the bridge circuits $B_1$, $B_2$, . . . $B_{20}$ may be used to produce an indication of the liquid level in container 21 and the auxiliary bridge arms for each of these bridges may be utilized in the manner described above to produce an indication of the relative fluid levels in the containers.

If desired, an additional pair of bridge arms may be added for each of the sensor capacitors in the container 50 to determine the liquid level in that container directly or the voltage between output terminal $O_{1'}$ in the fixed pair of arms containing capacitors $C_{12}$ and $C_{13}$ of bridge circuit $B_1$ and the output terminal $O_{1''}$ between the auxiliary bridge arms may be used to give a direct indication of liquid level in the small container 50. Utilizing separate bridge circuits for each function has the advantage of allowing the maximum number of circuit adjustments to compensate for variations in components but has the distinct disadvantage of using a maximum number of components. The circuitry illustrated in FIG. 5 represents a compromise which is preferred for most applications.

An indication of the liquid level in container 21 may be obtained from the voltages produced by the circuitry described above, the terminals $O_1$ and $O_{1'}$ of bridge circuits $B_1$ through $B_{20}$, inclusive, may be connected to the circuit of FIG. 3 as described with respect thereto and the circuit of either.

FIG. 6 or 7 may be used in connection with the circuit of FIG. 5 to convert the difference voltages $e_{d1}$ through $e_{d20}$ into a form which can be used to indicate the total liquid level difference and to perform the desired control functions. Only three individual utilization circuits or channels are illustrated in each of these figures in order to simplify both the drawings and the description. However, it is to be particularly understood that an individual utilization channel is required for each pair of capacitor sections being compared.

In the circuit of FIG. 6, the input terminals of the utilization channels or circuits $U_{d1}$, $U_{d2}$ and $U_{d3}$ are given the reference characters O and O'' with the subscript which corresponds to the number of the particular capacitor sections within the tanks 21 and 50 with which it is associated. This is done to indicate that the utilization circuits are connected to receive the difference voltages $e_d$ from the output terminals of the bridge circuits illustrated in FIG. 5. Thus, the difference voltages $e_{d1}$ to $e_{d3}$, inclusive, are applied between input terminals $O_1$—$O_{1''}$, $O_2$—$O_{2''}$, and $O_3$—$O_{3''}$ of channels $U_{d1}$ through $U_{d3}$, respectively. These voltages are amplified by conventional amplifiers $M_1$ through $M_3$, respectively, which are connected to energize normally open relays $R_1$ through $R_3$. These amplifiers may be of the same kind described with respect to amplifiers A illustrated in the circuit of FIG. 3. The output of each of the electronic amplifiers $M_1$ through $M_{20}$ is applied to individual input terminals of an electronic summing amplifier $\Sigma A$ through the switch arms $R_s$ of the relay in the particular utilization circuit. The summing amplifier may be of any conventional type which will produce an output voltage between its output terminals, which voltage is proportional to the sum of the voltage applied to all of its input terminals. An amplifier for performing such a function is illustrated and described in connection with FIG. 1.7d on page 11 of the book entitled Electronic Analog Computers by Korn and Korn, McGraw-Hill Book Company, Inc., 1952.

When the bridge circuits are all balanced, that is, when the voltage applied to the input terminals $O_1$—$O_{1''}$ through $O_{20}$—$O_{20''}$, inclusive, is zero, no voltage is applied to the summing amplifier $\Sigma A$ and it therefore does not produce an output voltage. However, if any one of the bridges becomes unbalanced, it produces an output voltage which may be used to indicate the exact difference in liquid level between the two tanks.

For example, if the liquid level in tank 50 is somewhere in the third capacitor section $C_{3'}$ and the liquid level in tank 21 is in the range of the first capacitor $C_1$, then bridges 1, 2 and 3 are unbalanced. The first bridge circuit is unbalanced and produces an output voltage $e_{d1}$ of a magnitude which depends upon the difference in level of the liquid in the first capacitor sections $C_1$ and $C_{1'}$. The second bridge is unbalanced a large amount since the second capacitor $C_{2'}$ in tank 50 has a large value whereas $C_2$ in tank 21 has a low value. The third bridge section produces an unbalance voltage $e_{d3}$ of a magnitude which is determined by the difference in capacitance between the capacitors $C_3$ and $C_{3'}$ in the two tanks. Thus, since the liquid is somewhere within the third capacitor $C_{3'}$ of tank 50, its dielectric is partially air and partially liquid. The bridge unbalance is something less than the maximum and an unbalance voltage $e_{d3}$ is indicative of the actual liquid level in the third capacitor $C_{3'}$.

These three difference voltages $e_{d1}$, $e_{d2}$ and $e_{d3}$ are amplified by the amplifiers $M_1$, $M_2$ and $M_3$ of their respective utilization circuits $U_{d1}$, $U_{d2}$ and $U_{d3}$ and applied to the summing amplifier $\Sigma A$. Since the summing amplifier $\Sigma A$ produces an output voltage which is a function of the sum of the voltages applied thereto, its output voltage is also a function of difference in liquid levels in the two tanks. Therefore, this output voltage may be applied to a measuring instrument such as a conventional voltmeter to give a visual indication of difference in liquid level or it may be used to perform a desired control function. For example, it may be applied to the terminals 59 of a reversible motor 58, as illustrated in FIG. 4, to open or close the control valve 57 in the outlet conduit 52 of tank 21. In this manner, the flow of liquid from the tank 21 is controlled, the relative rates of liquid flow from the two tanks is also controlled, and consequently the relative liquid levels in the two tanks is controlled. This arrangement may also be used to insure that the liquid is exhausted from both tanks at substantially the same instant.

FIG. 7 illustrates circuitry which may be used for accomplishing the same result as that described with regard to the circuit of FIG. 6. For this particular application, the difference voltages $e_{d1}$ through $e_{d20}$ are again applied to individual utilization circuits or channels $U_{d1'}$ through $U_{d20'}$ inclusive. Again only three of these circuits or channels are illustrated as a matter of convenience in describing and illustrating the particular embodiment of the invention, although it is to be understood that one such circuit is provided for each bridge circuit. The input terminal to the three utilization channels illustrated is again designated by the characters $O_1$—$O_{1''}$, $O_2$—$O_{2''}$, and $O_3$—$O_{3''}$, to indicate the bridge circuits of FIG. 5 to which these terminals are connected. The utilization channels of the remaining 17 pairs of capacitor sections are identical to each of the three illustrated and described here. The utilization circuits of FIG. 7 are also like those of FIG. 6 in that the output of each channel is applied to an individual input terminal of a summing amplifier $\Sigma A'$ which is of the type described in connection with that figure. The principal difference between the circuitry of FIGURES 6 and 7 is that the utilization circuits of FIG. 7 may be considered unidirectional potential circuits rather than alternating potential circuits.

Referring specifically to FIG. 7, it is seen that the first utilization channel $U_{d1'}$ includes an alternating current electronic amplifier $M_{d1}$ preferably operated class A, which is connected to receive the difference voltage $e_{d1}$ and produce an alternating output voltage which may be applied to a phase-sensitive demodulator $d_1$ which takes the alternating waveform as illustrated between this circuit and the amplifier $M_{d1}$ and converts it to a unidirectional voltage which has a magnitude proportional to the amplitude of the applied alternating voltage and a polarity determined by its phase. This circuit may be any conventional phase sensitive demodulator such as the amplistat discriminator referred to in the discussion of the circuit of FIG. 3. This unidirectional voltage is applied to a dead space circuit $DS_1$. The characteristics of the dead space circuit are such that the circuit will not produce an output either positive or negative until a predetermined magnitude of voltage is applied thereto, but once the circuit starts to produce an output, its output is a linear function of the applied voltage. This characteristic is illustrated on the block diagram which designates the dead space circuit. One commonly used dead space circuit is illustrated in FIG. 3.8c on page 74 of the book entitled Electronic Analog Computers by Korn and Korn, published by McGraw-Hill Book Company, Inc., 1952. The output of the dead space circuit $DS_1$ and hence of utilization circuit $U_{d1}$ is applied to the summing amplifier $\Sigma A'$. As was previously described, the output potentials of the other utilization circuits $U_{d2}$ through $U_{d20}$ are also applied to the summing amplifier $\Sigma A'$ and therefore the output of the summing amplifier $\Sigma A'$ represents the difference in liquid level in the same manner as was discussed with respect to the summing amplifier $\Sigma A'$ of FIG. 6. Thus, the voltage from the summing amplifier may be used to perform the same control functions and provide the same indications as was discussed with respect to the circuit of FIG. 6.

While particular embodiments of the invention have been shown, it will, of course, be understood that the invention is not limited thereto, since many modifications both in the circuit arrangement and in the instrumentalities employed, may be made. It is contemplated that the appended claims will cover any such modifications as fall within the true spirit and scope of this invention.

What I claim as new and desire to secure by Letters Patent of the United States is:

1. A fluid level sensing apparatus including capacitor means arranged to receive the fluid to be sensed between its electrodes, one set of electrodes of said capacitor means including a plurality of vertically spaced segments whereby variations in fluid level determine the number of said vertically spaced segments having a dielectric including the fluid, means responsive to said capacitance means to produce a voltage which is a function of the number of capacitors having a dielectric of the fluid, and means coupled to said capacitance means to produce an electrical potential which is a function of the liquid level in the upper liquid containing segment.

2. Fluid level sensing apparatus including capacitor means adapted to utilize the fluid as its dielectric material, a pair of vertically disposed spaced apart, concentric cylindrical plate means, one of said cylindrical plate means comprising a plurality of spaced annular rings to form a series of individual capacitors with the other cylindrical plate means, means to produce a voltage which is a function of the number of capacitors containing fluid, and means to produce a voltage which is a function of the exact level of the liquid on the individual capacitor containing the upper limit of the fluid.

3. Apparatus for producing an indication of the level of a liquid body at some remote position including the combination of capacitor means positioned to receive the fluid to be sensed between its electrodes, one set of electrodes of said capacitor means including a plurality of vertically spaced segments having a dielectric including the fluid, circuit means electrically coupled to said capacitance means for producing a voltage which is a function of the position of the liquid level relative to said capacitance means, and utilization circuit means coupled to receive the voltage produced by said circuit means and produce a first voltage which is a function of the number of said capacitor segments having a dielectric material comprised of the fluid and a second voltage which is a function of the level of the liquid in the uppermost segment containing liquid.

4. A fluid level measuring apparatus including, in combination, capacitor means positioned to receive the fluid to be measured between its electrodes, one set of electrodes of said capacitor means including a plurality of vertically spaced segments electrically insulated from each other, whereby a plurality of individual capacitors is formed, a plurality of individual measuring circuits each coupled to a corresponding one of said individual capacitors to produce a voltage which is a function of the value of the associated capacitor; a plurality of individual utilization circuits each coupled to receive the voltage produced by a corresponding one of said measuring circuits, each of said utilization circuits including means to insure that only the individual one of said utilization circuits which corresponds to that capacitor segment in which the upper fluid level is located is connected to supply an output voltage, and each of said utilization circuits including means to produce an output voltage which is a function of the level of the liquid therein.

5. A fluid level measuring apparatus including, in combination, capacitor means positioned to receive the fluid to be measured between its electrodes, one set of electrodes of said capacitor means including a plurality of vertically spaced segments electrically insulated from each other whereby a plurality of individual capacitors is formed, a plurality of individual measuring circuits each coupled to a corresponding one of said individual capacitors to produce a voltage which is a function of the value of the associated capacitor; a plurality of individual utilization circuits each coupled to receive the voltage produced by a corresponding one of said measuring circuits, each of said utilization circuits including means to insure that only the individual one of said utilization circuits which corresponds to that capacitor segment in which the upper fluid level is located is connected to supply an output voltage which is a function of the level of the liquid therein and means to supply a second output voltage which is a function of the number of the preceding capacitor segments which are full of fluid when said utilization circuit is connected to supply an output voltage.

6. Apparatus for determining the relative fluid levels in two fluid bodies including first and second capacitor means each arranged to receive the fluid in an opposite one of the fluid bodies between the electrodes thereof, one set of electrodes of each of said capacitor means including a plurality of vertically spaced segments, thereby to provide a plurality of individual capacitors whereby fluid level in the fluid bodies determines the number of said vertically spaced segments of the capacitor means having a dielectric including the fluid, means to compare corresponding capacitors of each capacitor means, thereby to obtain an indication of the relative fluid levels.

7. Apparatus for determining the relative fluid levels in two fluid bodies including first and second capacitor means, each arranged to receive the fluid in an opposite one of the fluid bodies between the electrodes thereof, one set of electrodes of each of said capacitor means including a plurality of vertically-spaced segments, thereby to provide a plurality of individual capacitors whereby fluid level in the fluid bodies determines the number of said vertically-spaced segments of the capacitor means having a dielectric including the fluid, means to compare corresponding capacitors of each capacitor means, and producing a voltage indicative of the difference in capacitance of each pair of segments so compared, and means to produce a voltage which is a function of the sum of the voltages so produced, thereby to obtain an indication of the relative fluid levels.

8. Apparatus for determining the relative fluid levels in two fluid bodies, including first and second capacitor means each arranged to receive the fluid in an opposite one of the fluid bodies between the electrodes thereof, one set of electrodes of each of said capacitor means including a plurality of vertically-spaced segments thereby to provide a plurality of individual capacitors whereby fluid level in the fluid bodies determines the number of said vertically spaced segments of the capacitor means having a dielectric including the fluid, means to compare corresponding capacitors of each capacitor means thereby to obtain an indication of the relative fluid levels, and means to produce a voltage which is a function of at least one of said first and second capacitance means, thereby to obtain an indication of the liquid level in said capacitance means.

References Cited in the file of this patent

UNITED STATES PATENTS

| | | |
|---|---|---|
| 1,504,978 | Robbins | Aug. 12, 1924 |
| 2,230,137 | Ewertz | Jan. 28, 1941 |
| 2,289,202 | McCoy | July 7, 1942 |
| 2,375,084 | Coroniti et al. | May 1, 1945 |
| 2,423,875 | Curtis et al. | July 15, 1947 |
| 2,428,898 | Waymouth | Oct. 14, 1947 |
| 2,511,398 | De Giers et al. | June 13, 1950 |
| 2,570,218 | Draganjac | Oct. 9, 1951 |
| 2,672,880 | Hermanson | Mar. 23, 1954 |
| 2,735,301 | Schwob | Feb. 21, 1956 |
| 2,751,531 | Barrett | June 19, 1956 |
| 2,775,892 | Godde | Jan. 1, 1957 |
| 2,793,529 | Bancroft | May 28, 1957 |
| 2,817,351 | Kling | Dec. 24, 1957 |
| 2,833,147 | Di Franco | May 6, 1958 |
| 2,868,015 | Haropulos | Jan. 13, 1959 |
| 2,919,579 | Gronner | Jan. 5, 1960 |
| 2,963,908 | Shawhan | Dec. 13, 1960 |

FOREIGN PATENTS

| | | |
|---|---|---|
| 700,099 | Germany | Dec. 13, 1940 |